United States Patent
Raitola

(10) Patent No.: US 11,485,606 B2
(45) Date of Patent: Nov. 1, 2022

(54) SMARTWATCH AND ELEVATOR AND GUIDE SYSTEM

(71) Applicant: KONE Corporation, Helsinki (FI)

(72) Inventor: Pasi Raitola, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1247 days.

(21) Appl. No.: 15/943,246

(22) Filed: Apr. 2, 2018

(65) Prior Publication Data

US 2018/0222716 A1    Aug. 9, 2018

Related U.S. Application Data

(63) Continuation of application No. PCT/EP2015/074152, filed on Oct. 19, 2015.

(51) Int. Cl.
*B66B 1/34* (2006.01)
*B66B 3/00* (2006.01)
(Continued)

(52) U.S. Cl.
CPC .......... *B66B 1/3461* (2013.01); *B66B 1/2408* (2013.01); *B66B 3/006* (2013.01);
(Continued)

(58) Field of Classification Search
CPC .................................................. B66B 1/1208
(Continued)

(56) References Cited

U.S. PATENT DOCUMENTS 6,223,160 B1 *  4/2001  Kostka ................. B66B 1/468
                                              704/275
6,986,408 B2 *  1/2006  Takeuchi ............... B66B 1/14
                                              187/247
(Continued)

FOREIGN PATENT DOCUMENTS

CN         1905747 A       1/2007
CN       101132981 A       2/2008
(Continued)

OTHER PUBLICATIONS

International Search Report for PCT/EP2015/074152 dated Jul. 13, 2016.
(Continued)

*Primary Examiner* — Reza Nabi
(74) *Attorney, Agent, or Firm* — Birch, Stewart, Kolasch & Birch, LLP

(57) ABSTRACT

A smartwatch includes a destination handling unit configured to issue a destination call in an elevator system of an environment. The smartwatch has an input for entering destination data as well as an output for indicating an allocated elevator of the elevator system. The smartwatch includes a navigation system including a memory with map data of the environment. The navigation system includes a position detector for detecting the location of the smartwatch within the environment, and a navigation output connected with the output. The navigation system is coupled with the destination handling unit to issue a destination call based on data of the position detector and/or for providing navigation guide data based on an issued destination call.

24 Claims, 4 Drawing Sheets

(51) Int. Cl.
*G01C 21/20* (2006.01)
*B66B 1/24* (2006.01)
*G06F 1/16* (2006.01)
*H04W 4/02* (2018.01)

(52) U.S. Cl.
CPC ........... *G01C 21/206* (2013.01); *G06F 1/163* (2013.01); *H04W 4/02* (2013.01)

(58) Field of Classification Search
USPC ......................................................... 187/391
See application file for complete search history.

(56) References Cited

U.S. PATENT DOCUMENTS

| | | | |
|---|---|---|---|
| 7,093,693 B1* | 8/2006 | Gazdzinski | B66B 3/00 340/5.2 |
| 8,744,754 B2* | 6/2014 | Kappeler | B66B 1/468 701/410 |
| 8,811,951 B1* | 8/2014 | Faaborg | G06F 3/0481 455/418 |
| 9,213,473 B2* | 12/2015 | Hovi | G06F 3/0484 |
| 10,023,427 B2* | 7/2018 | Scoville | B66B 1/468 |
| 2007/0026802 A1* | 2/2007 | Gerstenkorn | B66B 1/468 455/41.2 |
| 2007/0151809 A1* | 7/2007 | Tyni | B66B 3/00 187/391 |
| 2008/0010013 A1 | 1/2008 | Rusanen | |
| 2008/0236956 A1 | 10/2008 | Finschi | |
| 2012/0031711 A1 | 2/2012 | Gerstenkorn et al. | |
| 2012/0253658 A1* | 10/2012 | Kappeler | B66B 1/3415 701/410 |
| 2014/0231184 A1 | 8/2014 | Kappeler et al. | |
| 2014/0262629 A1* | 9/2014 | Toutaoui | B66B 5/0025 187/393 |
| 2015/0186092 A1* | 7/2015 | Francis | G06F 21/35 345/520 |
| 2015/0204678 A1 | 7/2015 | Schuster | |
| 2015/0210505 A1 | 7/2015 | Fujiwara | |
| 2016/0134686 A1* | 5/2016 | Youker | G06F 9/5072 709/217 |
| 2016/0251199 A1* | 9/2016 | Kronkvist | B66B 1/468 187/381 |
| 2017/0166416 A1* | 6/2017 | Scoville | B66B 1/3461 |
| 2017/0289344 A1* | 10/2017 | Greenberger | H04W 4/30 |
| 2017/0300820 A1* | 10/2017 | Raitola | B66B 1/3461 |
| 2017/0305715 A1* | 10/2017 | Tang | G06F 3/0346 |
| 2018/0121072 A1* | 5/2018 | Baldi | B66B 1/468 |
| 2018/0222716 A1* | 8/2018 | Raitola | B66B 3/006 |
| 2018/0262388 A1* | 9/2018 | Johnson | H04L 63/0823 |
| 2019/0031467 A1* | 1/2019 | Simcik | B66B 1/3461 |
| 2019/0135580 A1* | 5/2019 | Scoville | B66B 1/468 |
| 2019/0263627 A1* | 8/2019 | Huang | B66B 1/3461 |
| 2019/0276273 A1* | 9/2019 | Zhang | H04W 48/12 |
| 2019/0292010 A1* | 9/2019 | Li | H04W 52/0264 |
| 2020/0262679 A1* | 8/2020 | Simcik | B66B 1/468 |
| 2020/0324998 A1* | 10/2020 | Simcik | G07C 9/27 |
| 2021/0047144 A1* | 2/2021 | Finschi | B66B 1/468 |
| 2021/0347603 A1* | 11/2021 | Frossard | G06F 3/04886 |
| 2022/0112049 A1* | 4/2022 | Perunka | B66B 25/003 |

FOREIGN PATENT DOCUMENTS

| | | |
|---|---|---|
| CN | 101238057 A | 8/2008 |
| CN | 101842307 A | 9/2010 |
| CN | 102616614 A | 8/2012 |
| CN | 103476694 A | 12/2013 |
| CN | 104584085 A | 4/2015 |
| CN | 104803244 A | 7/2015 |
| JP | 2000-236571 A | 8/2000 |
| WO | WO 2009/132696 A1 | 11/2009 |
| WO | WO 2014/118424 A1 | 8/2014 |

OTHER PUBLICATIONS

Written Opinion of the International Searching Authority for PCT/EP2015/074152 dated Jul. 13, 2016.

* cited by examiner

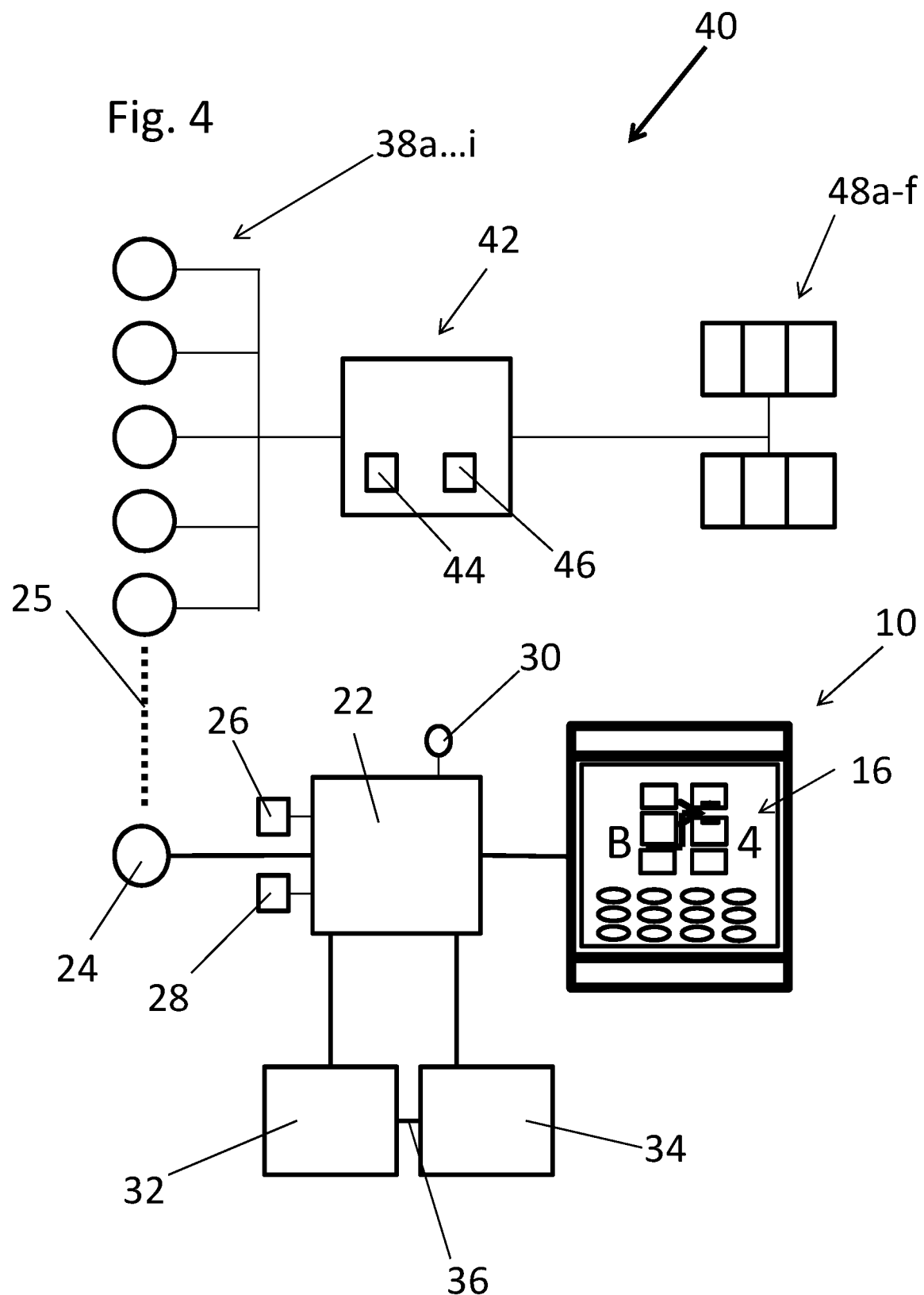

SMARTWATCH AND ELEVATOR AND GUIDE SYSTEM

CROSS REFERENCE TO RELATED APPLICATIONS

This application is a Continuation of PCT International Application No. PCT/EP2015/074152, filed on Oct. 19, 2015, which is hereby expressly incorporated by reference into the present application.

BACKGROUND OF THE INVENTION

The present invention relates to a smartwatch comprising a destination handling unit which is configured to issue a destination call in an elevator system of an environment. The smartwatch has input means for entering destination data as well as output means for indicating an allocated elevator of said elevator system. The smartwatch further has communication means to communicate with the elevator system. Such a smartwatch and elevator and guide system are known from U.S. Pat. No. 6,223,160 B1.

SUMMARY OF THE INVENTION

It is object of the present invention to provide a smartwatch and an elevator and guide system which facilitates user's orientation and use efficiency of elevator systems in unfamiliar environments.

The object of the invention is solved with a smartwatch according to claim 1 as well as with an elevator and guide system according to claim 12. Further, the object is solved with a method according to claim 22. Preferred embodiments of the invention are subject-matter of the corresponding dependent claims. Further embodiments of the invention are also described in the description and drawings.

According to the invention, the smartwatch comprises a navigation system including a memory with map data of the environment, which navigation system comprises position detection means for detecting the location of the smartwatch within the environment and a navigation output connected with the output means of the smartwatch. The smartwatch further has communication means for establishing the communication with the elevator and guide system of the environment.

The navigation system of the smartwatch is connected with the destination handling unit of the smartwatch to exchange destination data of a destination call and/or to exchange position data of the navigation system. The destination handling unit of the smartwatch is connected with the navigation system of the smartwatch either directly or via a smartwatch control or other modules within the smartwatch. Via this measure the smartwatch is able to issue a destination call based on the signal of the position detection means and/or it is able to provide navigation guide data based on an issued destination call, which destination call is preferably issued by the input means of the smartwatch but which also may be issued via a destination operating panel of the elevator system.

The-common-output means of the smartwatch can thus be used to indicate/display destination data from the destination handling unit, e.g. a destination floor and an allocated elevator, and/or it can be used to indicate navigation guide data from the navigation system to the user either via the display of the smartwatch and/or acoustically via its loudspeaker.

The destination handling unit is via the above mentioned connection able to use the signal of the position detection means of the navigation system to issue a destination call or to prompt the issuing of a destination call to be input via the input means of the smartwatch. Thus, if a passenger comes near to the lobby of the elevator system, the user carrying the smartwatch may be prompted to select a destination which could e.g. either be a pre-programmed destination for that particular user (smartwatch ID) or a destination which may be chosen manually, e.g. a desired destination floor, or a destination from a list of pre-selected destinations provided for said particular environment. In any case, there is a direct interaction between the destination handling unit and the navigation system of the smartwatch which facilitates the orientation of passenger or user in any unknown environment.

The corresponding destination handling unit can be for example started via an application or program (App) in the smartwatch when it comes into the vicinity of the environment, e.g. via an interaction between a transmitter of the environment, e.g. a beacon, and communication means of the smartwatch, e.g. a wireless short-range transmitter.

The interaction preferably launches the App of the destination handling unit. The launching of the App can also be triggered by WLAN interaction or via a telephone communication system which allows the smartwatch to communicate with the elevator system via a server connected to a public communication network, e.g. the internet. Also the App of the navigation system may be launched. Alternatively, the App of the navigation system may be continuously running on the smartwatch so that it does not need to be launched when the environment is entered by the user.

Preferably, the navigation system comprises a memory configured to input a current or predetermined position as a selectable destination of said environment. Accordingly, any common data of the destination handling unit and the navigation system can be stacked up with appropriate destinations of the user of the smartwatch. Preferably, the smartwatch has a singular ID which is preferably stored in the elevator system, preferably together with its correlated destinations. Via this means, the destinations of the corresponding user have not to be stored in the memory of the smartwatch but may be stored in the elevator system and can be transferred to the smartwatch via handshake when the corresponding user enters the environment. The communication between the smartwatch and the environment, for example a residential- or office building, a mall or a train station or airport, can be provided via a short range communication system as e.g. Bluetooth, via WLAN or via a telephone network. The communication between the elevator system and the smartwatch may happen via a server of the elevator system which is either provided in the environment or which is a remote internet server of the elevator system which is connected to the elevator control of the elevator system, e.g. via LAN. The smartwatch comprises the corresponding communication means to establish said communication with communication devices of the elevator and guide system located in the environment, e.g. beacons, e.g. a short range communication transmitter, a telephone communication module and/or a WLAN transmitter.

In a preferred embodiment of the invention, the navigation system comprises a memory with map data of the environment with several pre-selected destinations, whereby the output means is configured to display said map data. The destinations are selectable via the input means of the smartwatch. Via this measure, a variety of different individual destinations of said environment can easily be selected by the user supported via the output and input means of the smartwatch. The input means and output means of the smartwatch are therefore used as a destination operating panel of the elevator system allowing a destination call to be issued to the elevator system and an allocated elevator being indicated via the output means, e.g. display of the smartwatch. The input and output means of the smartwatch may be realized via a touch screen which integrates input and output functionality in a per se known manner. Of course, also a microphone and loudspeaker of the smartwatch may be used as an input and output means which enables a person to give audio commands for a destination call or to have an allocated passenger or navigation guide data outputted as audio signals for the passenger which is essential for example in case of view-handicapped people.

The position data may optionally include altitude/floor data. In this case it is preferable that the smartwatch comprises a barometer giving the altitude of the user's current position. This altitude can be converted to floor data by the elevator and guide system, particularly by the navigation system of the smartwatch.

Anyway, the generation of position data is possible under use of different position data sources, on one hand of the smartwatch itself and/or on the other hand from several position sensors, which may be located in connection with at least some of the beacons in the environment and of course their interaction with the smartwatch.

In a preferred embodiment the smartwatch is configured communicate wirelessly with a user's smartphone that contains at least some of the functionality of the smartwatch, e.g. the smartwatch's control and/or hardware and software components. Thus, the smartphone may comprise the destination handling unit and/or the navigation system and the smartwatch may comprise input/output functionality of the above described smartwatch. At the minimum this reduced version of the smartwatch which is used in connection with a smartphone only comprises the user interface (input/output means). Actually, in this embodiment the "smartwatch" as understood by the present invention is a combination of said reduced version of smartwatch carried on the user's wrist and the smartphone carried by the user.

In a preferred embodiment of the inventive system and method the position data may be used to select one of pre-programmed set of destination to be indicated on the smartwatch output means, e.g. touch-screen. This feature allows environment specific and/or user/user-group specific destinations to be set and can further be used to realize access control to allowed access areas. For example based on GPS, the elevator and guide system knows at which entrance the user is entering the environment (building) and selects pre-programmed destinations specific to that entrance and environment (and user).

Preferably, the smartwatch is configured to transfer one of the previous named pre-selected or manually inputted destinations into the destination handling unit as to issue a destination call. This enables a smooth interaction between the navigation system and the destination handling unit of the smartwatch.

Preferably, the position detection means of the navigation system of the smartwatch comprises a short range transmitter configured to communicate with beacons located in the environment. This measure enables the establishment of a navigation system within the environment without any telephone communication or GPS connection. Thus, the navigation in an environment can be made independent of these public navigation support systems. The beacons may be located in the environments at appropriate locations to allow a continuous guide of a passenger throughout the environment between e.g. the entrance and all possible destinations within the environment. Particularly, such beacons may particularly be located in crowded areas of the environment, e.g. at the entrances/exits and in the lobby of elevators and escalators/moving sidewalks/ramps.

Generally, the invention may work not only with an elevator system but with any kind of passenger transportation systems, as e.g. escalators, moving sidewalks, moving ramps etc. Anyway, the advantages of the invention are particularly apparent in connection with one or several elevator systems located in the environment.

Preferably, the smartwatch, i.e. the position detection means of the smartwatch, also comprises a receiver for signals from geostationary satellites, e.g. GPS. Via this measure, the GPS navigation may be used in an environment where this is possible. Further, the navigation procedure within the environment, e.g. without GPS, may be coupled to a navigation procedure outside of the environment which may be based on GPS. This connection of combined navigation procedure may be used to guide a user from any location outside of the environment to a certain destination within the environment whereby the position detection means may change at the border of the environment from GPS communication to short range communication as mentioned above.

In a preferred embodiment of the invention, the position detection means of the navigation system of the smartwatch comprises an accelerometer. Also a gyrometer and/or a barometer are adapted means to provide position data within a closed environment, particular in cases where within the environment no GPS data can be received. The position detection system of the smartwatch may thus be able to provide position data without access to GPS or telephone communication.

In a preferred embodiment of the invention, the smartwatch comprises a transmitter for a telephone communication network and the position detection means comprise means for position detection from the position of the smartwatch within the antennas of the communication network. Via this means, the smartwatch may use position information from the telephone communication network to obtain or improve its own position detection.

In a preferred embodiment of the invention, the navigation system comprises a calculating unit to indicate distances and/or directions to the destination for the user via the output means. This embodiment facilitates the handling of the navigation system for the user within the environment as he obtains the directions to be taken and/or the distances which he has to travel in the indicated direction to get to his desired destination.

The present invention also relates to an elevator and guide system of an environment comprising an elevator system with at least one elevator, an elevator control comprising a destination call control for said elevator and at least one smartwatch according to above-mentioned specifications serving as a destination operating panel and guide means of said elevator system in said environment. With respect to the features and advantages of said elevator and guide system, it is referred to the features and advantages mentioned in connection with the inventive smartwatch.

Preferably, the elevator system comprises a memory for user-individual destination data or route data, based on an individual ID of the smartwatch, to be displayed via the output means of the smartwatch. The smartwatch can thus be used by the elevator system to indicate for the user his individual relevant destination data so that he is able to obtain his desired destination in a very short time and in an easy manner as only those destinations are displayed on the output means of the smartwatch which are relevant for him. Thus, the user has not to select within a variety of multiple destinations which are not relevant for him. The selection of destinations in said environment is thus essentially facilitated.

Preferably, this memory is located within the smartwatch which allows a decentral handling of said user-individual destination data on the smartwatch. The accessibility of said destination data is in this case not dependent on the operating status of the elevator system. The guide functionality of the smartwatch is then also available in cases where the elevator system is at least partially down.

In a preferred embodiment of the invention, the elevator and guide system comprises beacons arranged in the environment which beacons comprise a short range wireless communication system as e.g. Bluetooth® for communication with the smartwatch. These beacons can then be used for the exchange of destination data between the elevator control and the smartwatch so that destination calls can be issued via the smartwatch and allocated elevators can be indicated via the output means of the smartwatch. Furthermore, the beacons can be used for providing or updating position data of the navigation system of the smartwatch. Therefore, this embodiment is optimized to transmit data between the elevator control and the smartwatch so that the functionality of the smartwatch as destination operating panel as well as navigation guide can be optimized.

Preferably, the beacons transfer position data to the smartwatch to update of the current position data of its navigation system. The position detection means of the navigation system may be e.g. based on an internal gyrometer, accelerometer and/or barometer which means that these components may only provide rough position data of the smartwatch within the environment. By communicating with beacons located at defined positions within the environment, this position data may be updated so that the accuracy of the position detection is improved essentially.

In the same way, the beacons are preferably connected with the elevator system and are configured to transmit destination call data so that the smartwatch may transmit destination calls via these particular beacons to the elevator control.

Generally, the communication between the smartwatch and the elevator control of the elevator system may be provided via an internet server which is preferably accessed by the elevator control via LAN or WLAN. The smartwatch preferably comprises a WLAN transmitter and/or a telephone communication module for the communication with the internet server. The communication via the internet server has certain advantages as e.g. via said internet server certain applications regarding the destination handling unit and/or the navigation system may be transferred/launched on the operating system of the smartwatch and on the other hand, this internet server may coordinate the data exchange between the smartwatch and the elevator control of the elevator system. Of course, also a short-range communication can be used on this behalf, e.g. via the beacons located in the environment and a short range wireless transmitter of the smartwatch.

The present invention also refers to a method for guiding passengers in an environment comprising at least one elevator and guide system, in which method destination data from a destination handling unit of a smartwatch serving as a destination operating panel of said elevator and guide system is input into a navigation system of the smartwatch which uses the destination data and an indoor position detection means to guide the passenger to his destination floor or to his destination. Hereby also a destination call may be prompted or issued automatically based on the position data of the navigation system of the smartwatch in the environment. The features and advantages of this method are already described in connection with the inventive smartwatch. The elevator and guide system may be embodied as a combined integrated system. In an alternative embodiment the elevator system and the guide system may be realized as different systems operating in the environment independently of each other, so that a common functionality is only possible via the linking of the destination handling unit and the navigation system within the smartwatch.

Although the invention may be particularly relevant for a smartwatch it may also be applied to a smartphone instead of a smartwatch.

Preferably, the destination data of a pending call is transferred from the destination handling unit into the navigation system of the smartwatch to enable the output of navigation guide data via the output means of the smartwatch. Via this means, the navigation system of the smartwatch is able to indicate/display via its output means all necessary navigation guide data for the user of the smartwatch so that he is able to find the allocated elevators and optionally also his individual destination at the destination floor.

In a preferred embodiment of the invention, the smartwatch displays via its output means a table of selectable destinations in said environment, which selection is made via the input means of the smartwatch. Via this means, the user of the elevator and guide system of the environment can easily choose between different optional destinations in said environment which are indicated on the output means, e.g. display, e.g. touch screen of his smartwatch. The choice can easily be made by pushing corresponding (virtual or real) push buttons on the smartwatch, which are for example indicated on a touch screen of the smartwatch.

It is apparent for the skilled person that the abovementioned embodiments of the invention can be combined with each other arbitrarily. Furthermore, single features mentioned in the claims can be provided as a single unit or as multiple units whereby the features can be integrated with other features of the claim as long as this is feasible. Thus, the destination call control of the elevator system can be integrated in the elevator control. Furthermore, the elevator control can be integrated in a control server of the environment which integrates navigation as well as the control of the elevator and optionally escalator systems located in said environment. Of course, the environment may have several elevator groups or multi-groups at different locations within the environment. The smartwatch is then able to lead the user from the entrance into the environment to his final destination via several different transportation means as escalators or elevator groups or moving ramps, etc.

BRIEF DESCRIPTION OF THE DRAWINGS

The invention is hereinafter described with the aid of the enclosed drawings. In these drawings

DESCRIPTION OF THE PREFERRED EMBODIMENTS

Figure 1:
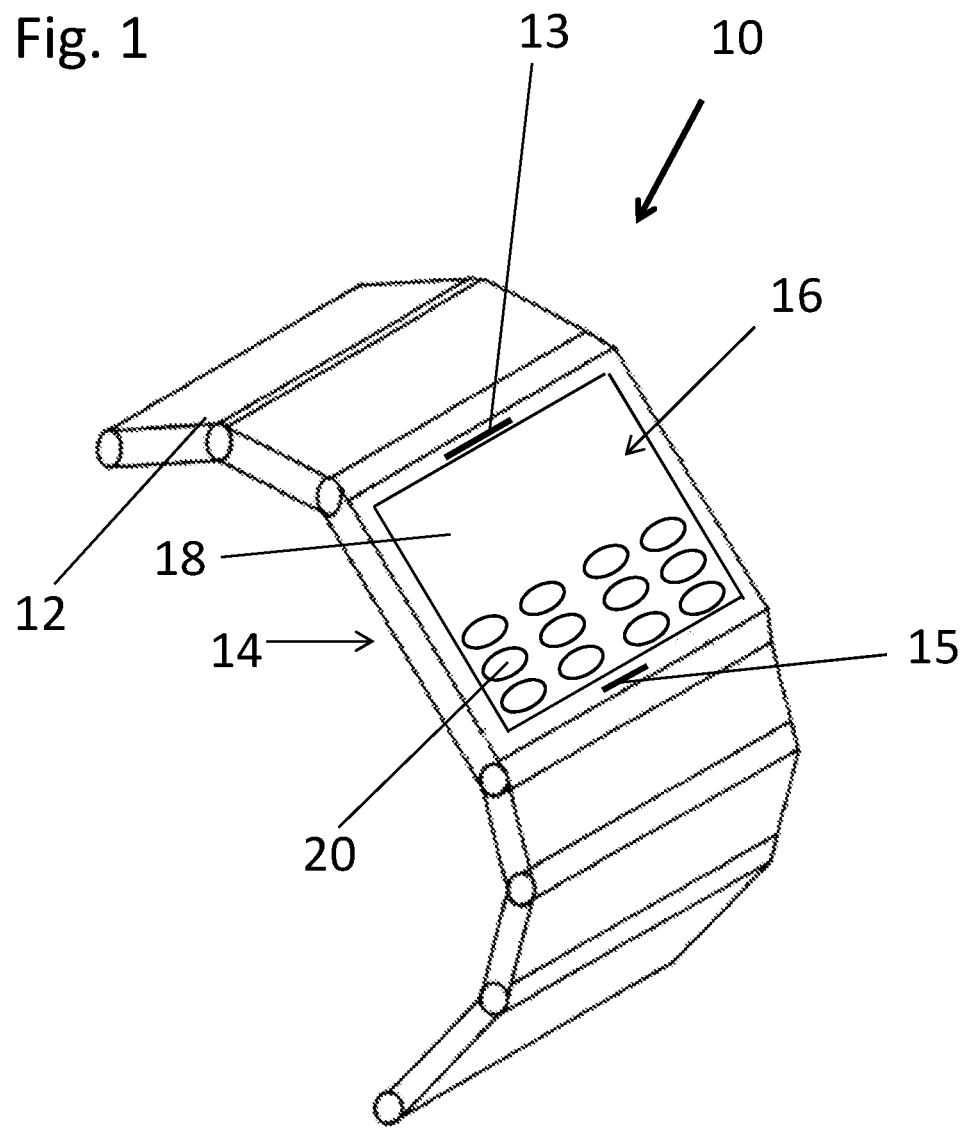
FIG. 1 shows a perspective view of an inventive smartwatch, FIG. 2 a map of an environment with beacons provided for transmitting position data and destination data between a smartwatch and the elevator control of an elevator group, FIG. 3 an enlarged view of the touch screen of the smartwatch of FIG. 1 showing the route for the user from a current position to an allocated elevator of an elevator group, FIG. 4 a schematic illustration of the elevator and guide system of an environment comprising at least one smartwatch.
Figure 3:
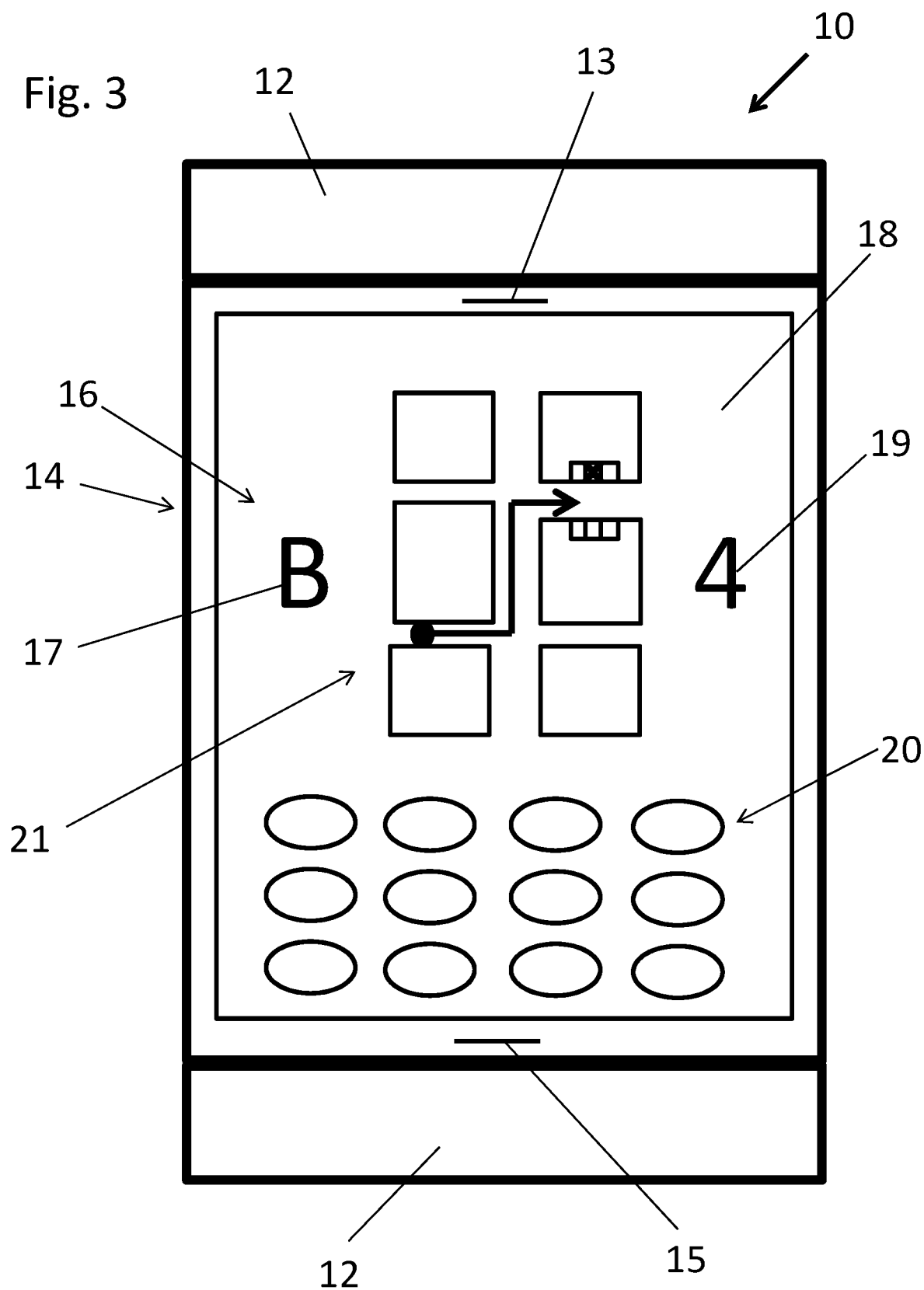

The inventive smartwatch 10 shown in FIG. 1 comprises a wristband 12 securing a smartwatch body 14 to the wrist of a user. Not shown in the figure is the lock of the wristband 12. The smartwatch body 14 comprises a large touch screen 16 which serves as display 18 as well as input means 20 for example by indicating virtual push buttons to be pressed by the user. The display is further configured (see FIG. 3) to indicate in field 17 the allocated elevator of a destination call and in field 19 the destination floor of the destination call. The smartwatch further comprises a loudspeaker 13 and a microphone 15.

Figure 2:
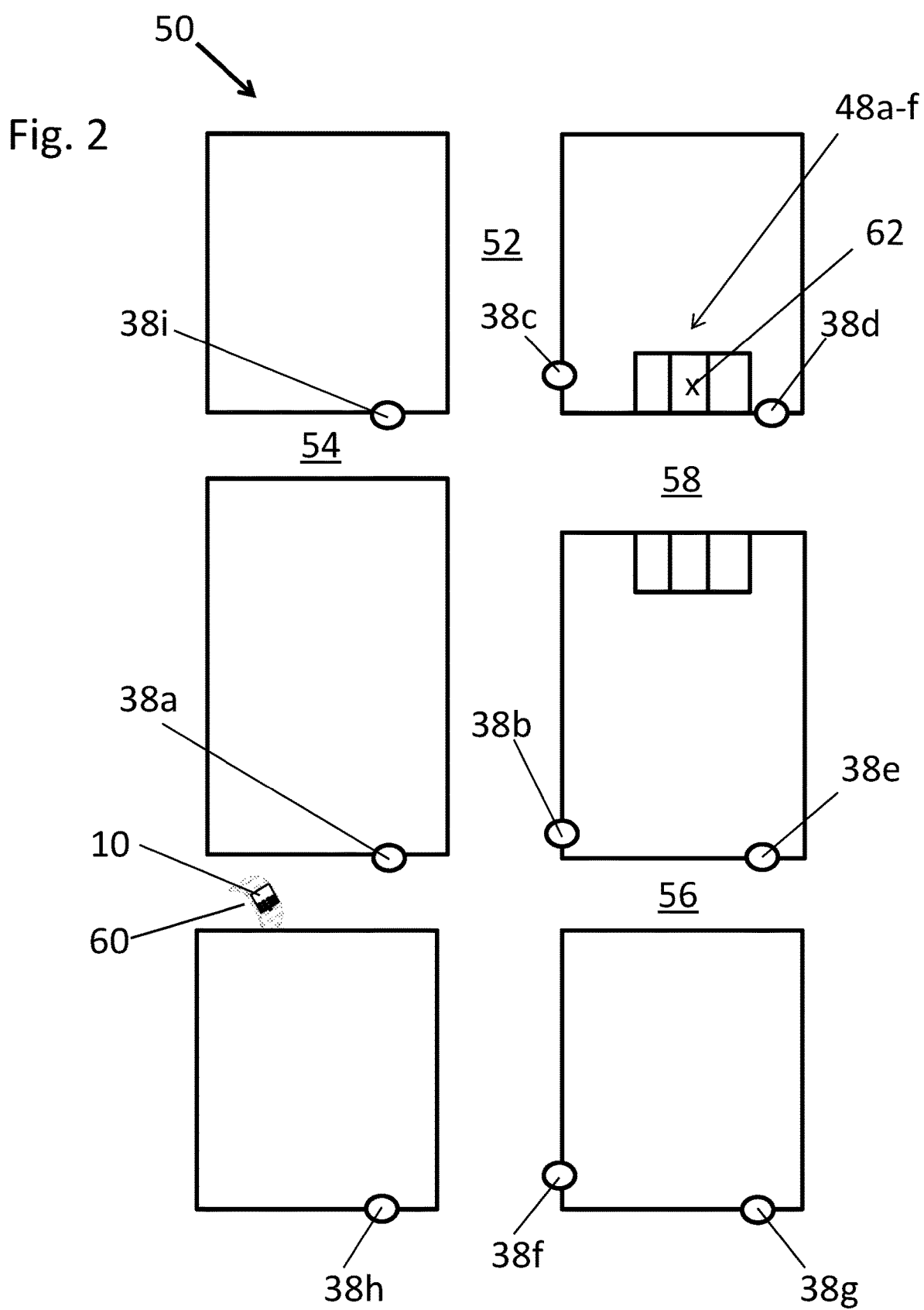

In connection with FIG. 4, the smartwatch 10 belongs to an elevator and guide system 40 in an environment 50 (FIG. 2). The smartwatch 10 further comprises a smartwatch control 22 connected to the touch screen 16 and a short range transmitter 24. The smartwatch 10 further comprises a gyrometer 26 as well as an accelerometer 28, whereby the gyrometer 26 and accelerometer 28 are optional features of the smartwatch 10. The smartwatch control 22 may further be connected to a telephone network communication module 30. The smartwatch control 22 is connected with a destination handling unit 32 and with a navigation system 34 which are connected optionally directly via line 36 to exchange data. The destination handling unit 32 and the navigation system 34 may also be integrated within the smartwatch control 22. The exchange may alternatively also happen via the elevator control 22 so that a direct connection 36 between the destination handling unit 32 and the navigation system 34 is not absolutely necessary.

The short range transmitter 24 of the smartwatch is able to communicate with beacons 38a-38d located in the environment 50 (FIG. 2) which environment may be a building, an arrangement of buildings, a mall, a train station, an airport, etc. The beacons 38a-38d are wireless transmitters working on a short range, e.g. using the Bluetooth® system. These beacons 38a-38d are connected to the central elevator and guide control 42 which comprises an elevator control 44 as well as a navigation control 46. These components 44, 46 may be integrated in the elevator and guide control 42 of the environment or being arranged as separate modules or units within the elevator and guide system 40, preferably within the environment. The elevator and guide control 42 is further connected with an elevator group 46 having six elevators 48a-48f. Parts of the elevator and guide system may also be located outside the environment, e.g. as an internet server.

FIG. 2 shows a part of a typical environment 50, i.e. a building with floors 52 to 56 and an elevator lobby 58. The beacons 38a-38d are located at certain positions, e.g. in equidistant positions within the floors 52 to 56 and in the elevator lobby 58.

The system works as follows:

When a user carrying the smartwatch 10 enters a building 50, the short range transmitter 24 of the smartwatch 10 communicates with a beacon 38a . . . i of the elevator and guide control 42 in the building 50. In this case, a program (App) is launched or started in the smartwatch 10 which makes the smartwatch part of the elevator and guide system 40 within the building 50. The App which is launched on the smartwatch control 22 prompts the user to input a destination on a list of destinations displayed via the touch screen 16 or to confirm a pre-selected destination. Upon choosing the pre-selected destination or a certain destination from the list of displayed destinations, a corresponding destination call is issued via the destination handling unit 32 communicated via the short range transmitter 24 of the smartwatch 10 to one of the beacons 38a-38d of the elevator and guide control 42 in the elevator and guide system 40. The elevator and guide control 42 transmits this destination call to the elevator control 44 which allocates one of the elevators 48a-48f. Further the elevator control 44 transmits the allocated elevator via one of the beacons 38a-38d to the short range transmitter 24 of the smartwatch 10, so that the allocated elevator may be indicated to the user on the display 18, e.g. as elevator B in the display filed 17 on the left side of the touch screen 16 and with the destination floor on the display field 19 on the right side of the display 18. Furthermore, this destination data is input to the navigation system 34. The navigation system 34 comprises a position detection means which receives from the beacons 38a-38d via the short range transmitter 24 of the smartwatch the actual position 60 of the user in the environment 50. Furthermore, the navigation system 34 may have map data of said environment either in a storage or obtained via short range transmission between a beacon 38a-38d and the short range transmitter 24 or via a telephone communication module 30. Via this map data and destination data of the destination call, the smartwatch is able to display the actual position 60 of the smartwatch—see FIGS. 2 and 3—on the smartwatch display 18 as well as the position 62 of the allocated elevator B. Further the navigation system 34 also outputs a navigation map 21 of the environment on the display 18 with the actual position, the route how to get through the environment 50 to the allocated elevator and the position 62 of the allocated elevator 48b.

For this navigation the navigation system 34 uses his position detection means, e.g. internal components as e.g. the gyrometer 26 and the accelerometer 28, barometer and/or the short range transmitter 24 of the smartwatch control 10 which communicates with the different beacons 38a-38d positioned at different locations in the building 50. The beacons 38a-38i are configured to provide position data for the smartwatch 10 via the short range transmitter 24 or to update the position data which has been calculated by the position detection means of the navigation system 34 via internal components 26, 28. Therefore, position data communicated via the beacons can be used to generate the position data of the navigation system 34 or only to update the position data.

In course of getting from the initial position 60 to the position 62 of the allocated elevator 48b, the user passes beacons 38a, 38b, 38c until he gets to beacon 38d which is located in the lobby 58 of the elevator group 48a-f. This route is indicated in navigation field 21 on the touch screen 16 of the smartwatch 10 together with the allocated elevator B on the left side field 17 as well as the destination floor (fourth floor) on the right side field 19 of the touch screen. Therefore, the touch screen 16 of the smartwatch 10 indicates the allocated elevator, the destination floor as well as the route from the current position of the user to the allocated elevator and possibly also the way at the destination floor from the elevator to his final destination.

Accordingly, the passenger of an environment can be guided in a smooth way from the entrance of the environment to his selected or pre-selected destination.

The invention is not restricted to the disclosed embodiment but may be varied within the scope of the appended patent claims.

List Of Reference Numbers 10 smartwatch
12 wristband
13 loudspeaker
14 smartwatch body
15 microphone
16 touchscreen
17 display field for allocated elevator
18 display part of touchscreen
19 display field for destination floor
20 push button part of touchscreen
21 navigation output field of touchscreen
22 smartwatch control
24 short range transmitter
26 gyrometer
28 accelerometer
30 telephone communication module
32 destination handling unit
34 navigation system
36 connection between destination handling unit and navigation system
38a . . i beacons located in the environment
40 elevator and guide system
42 elevator and guide control
44 elevator control
46 navigation control
48a-f elevators of elevator group
50 environment (building)
52 first floor
54 second floor
56 third floor
58 elevator lobby
60 actual position of the smartwatch
62 position of allocated elevator

The invention claimed is:

1. A smartwatch comprising:
a destination handling unit configured to issue a destination call in an elevator system of an environment;
an input for entering destination data;
an output for indicating an allocated elevator of said elevator system, wherein the output is a display device;
a wireless communication device for communication within the elevator system; and
a navigation system including a memory with map data of the environment, which navigation system comprises:
a position detector for detecting the location of the smartwatch within the environment; and
a navigation output connected with the output, wherein the navigation system is coupled with the destination handling unit to issue a destination call based on data of the position detector and/or for providing navigation guide data based on an issued destination call,
wherein the wireless communication device is a short range transmitter configured to communicate with a plurality of beacons located in the environment for determining a current position of the smartwatch relative to the environment, the plurality of beacons being separate from the elevator.

2. The smartwatch according to claim 1, wherein the navigation system comprises a memory to input a current or predetermined position as a selectable destination of said environment.

3. The smartwatch according to claim 1, wherein the navigation system comprises a memory with map data of the environment with several pre-selected destinations, said output is configured to output a plurality of destinations, and said input is configured to enable the selection of one of said plurality of destinations.

4. The smartwatch according to claim 2, which is configured to transfer said destination to the destination handling unit as to issue a destination call.

5. The smartwatch according to claim 1, wherein the position detector comprises a receiver for signals from geostationary satellites.

6. The smartwatch according to claim 1, wherein the position detector of the navigation system comprises an accelerometer.

7. The smartwatch according to claim 1, wherein the position detector of the navigation system comprises a gyrometer.

8. The smartwatch according to claim 1, wherein the position detector of the navigation system comprises a barometer.

9. The smartwatch according to claim 1, comprising a transmitter for a telephone communication network and the position detector is configured to detect the position from the position of the smartwatch within the antennas of the telephone communication network.

10. The smartwatch according to claim 1, wherein the navigation system comprises a calculating unit connected with the output to indicate distances and/or directions to the destination for the user.

11. An elevator and guide system of an environment comprising an elevator and guide system with at least one elevator, an elevator control comprising a destination call control for said elevator and at least one smartwatch according to claim 1 serving as a destination operating panel and as a guide of said elevator and guide system in said environment.

12. The elevator and guide system according to claim 11, wherein the elevator and guide system comprises a memory for user-individual destination data or route data, based on an individual ID of the smartwatch, to be displayed via the output of the smartwatch.

13. The elevator and guide system according to claim 12, wherein the memory is located within the smartwatch.

14. The elevator and guide system according to claim 11, wherein the beacons are arranged in equidistant positions within floors of the environment.

15. The elevator and guide system according to claim 14, wherein at least some of the beacons are connected with the elevator and guide system and are configured to transmit destination call data.

16. The elevator and guide system according to claim 1, wherein the beacons are arranged in equidistant positions within floors of the environment.

17. The elevator and guide system according to claim 11, wherein the smartwatch communicates with the elevator and guide system via an internet server.

18. The elevator and guide system according to claim 17, wherein the smartwatch comprises a WLAN-transmitter and/or a telephone communication module for the communication with the internet server and the elevator control is connected with the internet server via LAN or WLAN.

19. The elevator and guide system according to claim 11, wherein the smartwatch is configured to communicate wirelessly with a smartphone, whereby functionality of the smartwatch is shared between the smartwatch and the smartphone.

20. The elevator and guide system according to claim 19, wherein the smartwatch comprises the input/output, whereas the smartphone comprises the destination handling unit and/or the navigation system.

21. A method for guiding passengers in an environment comprising at least one elevator and guide system, the method comprising:

inputting destination data from a destination handling unit of a smartwatch serving as a destination operating panel of said elevator system into a navigation system of a smartwatch;

guiding a passenger to the destination floor of a destination call using the destination data of the destination call issued via the smartwatch and a position detector; and/or automatically issuing a destination call based on current position data of the smartwatch in the environment as detected by the position detector, wherein the position detector communicates with a plurality of beacons, via a short range transmitter of the smartwatch, to determine the current position of the smartwatch relative to the environment, the plurality of beacons located in the environment and being separate from the elevator.

22. The method according to claim 21, wherein the destination data of a pending call is transferred from the destination handling unit into the navigation system to output navigation guide data for the smartwatch user via the output of the smartwatch.

23. The method according to claim 21, wherein the smartwatch displays via the output a table of selectable destinations in said environment, which selection is made via the input of the smartwatch.

24. The method according to claim 21, wherein the smartwatch is used only together with a smartphone, whereby the smartwatch is configured to communicate wirelessly with the smartphone and the functionality of the smartwatch is shared between the smartwatch and the smartphone.

* * * * *